United States Patent
Mochizuki

(10) Patent No.: US 7,066,110 B2
(45) Date of Patent: Jun. 27, 2006

(54) METHOD OF MANUFACTURING GRANULATED BODY FOR ABSORBING EXCREMENT OF ANIMALS

(75) Inventor: Shotaro Mochizuki, Shizuoka-ken (JP)

(73) Assignee: Peparlet Co., Ltd., Shizuoka-ken (JP)

( * ) Notice: Subject to any disclaimer, the term of this patent is extended or adjusted under 35 U.S.C. 154(b) by 121 days.

(21) Appl. No.: 10/687,737

(22) Filed: Oct. 20, 2003

(65) Prior Publication Data

US 2004/0079292 A1    Apr. 29, 2004

(30) Foreign Application Priority Data

Oct. 28, 2002    (JP) .............................. 2002-313305

(51) Int. Cl.
*A01K 29/00*    (2006.01)
*A01K 1/15*    (2006.01)

(52) U.S. Cl. ...................................... 119/172; 119/171

(58) Field of Classification Search ........ 119/171–173, 119/161, 165, 166, 169, 442, 447, 458, 479, 119/28.5; 47/9, 59 S
See application file for complete search history.

(56) References Cited

U.S. PATENT DOCUMENTS

| 2,942,018 | A | * | 6/1960 | Kobayashi et al. ......... 556/128 |
| 3,969,268 | A | * | 7/1976 | Fukuda et al. ............. 502/425 |
| 5,667,779 | A | * | 9/1997 | Kubo .................... 424/93.462 |
| 5,688,482 | A | * | 11/1997 | Saastamoinen ............. 423/335 |
| 6,207,729 | B1 | * | 3/2001 | Medoff et al. ............. 523/129 |
| 6,448,307 | B1 | * | 9/2002 | Medoff et al. ............. 523/129 |
| 6,619,233 | B1 | * | 9/2003 | Mochizuki .................. 119/171 |
| 6,682,673 | B1 | * | 1/2004 | Skwiercz et al. ........... 264/128 |

FOREIGN PATENT DOCUMENTS

| JP | 8-182437 | | 7/1996 |
| JP | 10-113087 | | 5/1998 |
| JP | 2003310074 | A * | 11/2003 |
| JP | 2004201520 | A * | 7/2004 |

* cited by examiner

*Primary Examiner*—Son T. Nguyen
(74) *Attorney, Agent, or Firm*—Wenderoth, Lind & Ponack, L.L.P.

(57) ABSTRACT

Moisture absorbing efficiency of excrement is enhanced by providing a high degree of porosity and a high porosity ratio to a hydraulic granulated body and a non-hydraulic granulated body in a method of manufacturing a granulated body for absorbing excrement of animals. There is provided a method of manufacturing a granulated body for absorbing excrement of animals, characterized in that dry bamboo fibers and wood fibers are used as a chief material. The dry bamboo fibers and wood fibers are mixed with each other while adding moisture thereto and the dry bamboo fibers are allowed to absorb the moisture. The resultant is granulated to form a wet granulated body, hot air is blown to the wet granulated body, and the moisture absorbed in the dry bamboo fiber is transpired outward through the wet granulated body by the hot air. A porous structure in the dry bamboo fibers in the wet granulated body is produced by the transpiration due to formation of transpiring paths in the wet granulated body.

2 Claims, 4 Drawing Sheets

METHOD OF MANUFACTURING GRANULATED BODY FOR ABSORBING EXCREMENT OF ANIMALS

BACKGROUND OF THE INVENTION

1. Field of the Invention

This invention relates to a method of manufacturing a granulated body for absorbing excrement of animals, in which wood fibers and dry bamboo fibers are used for granulation as a chief material or dry bamboo fibers are used for granulation as a chief material and a water absorbing property is provided thereto.

2. Related Art

As shown in patent documents 1 and 2, a granulated body for excrement of animals in which a plurality of granulated bodies obtained by granulating wood fibers and providing a water absorbing property thereto are laid in a tray receptacle and subjected to excrement of pet animals such as cats, experimental animals or the like.

The patent document 1 shows granulated bodies obtained by using wood fibers as a chief material and selectively mixing inorganic filler, starch, water-absorptive polymer and the like. In order to obtain those granulated materials, a method is employed in which the main material and the mixing material are admixed in a hydraulic state, the resultant is cut and granulated at an outlet port side while extruding the resultant by an extruder. That is, the admixed main material and mixing material, which are in a wet state by water applied thereto, are extrusion molded so as to be granulated. After being granulated, they are dried to form a porous structure which is required for absorbing excrement.

Also, another method is employed for granulation, in which the main material and the mixing material are admixed in a hydraulic state, and the resultant is rollingly moved on an inner peripheral surface of a rotating cylinder. That is, as in the case with the extrusion molding, the wet admixed materials are roll-molded so as to be granulated. After being granulated, they are dried to form a porous structure which is required for absorbing excrement.

On the other hand, the patent document 2 shows a method, in which the admixed material of the main material and the mixing material is compression molded in a non-hydraulic state and granulated such that they each have a fixed shape.

[Patent Document 1]

Official Gazette of Japanese Patent Application Laid-Open No. H08-182437

[Patent Document 2]

Official Gazette of Japanese Patent Application Laid-Open No. H10-113087

However, the method for providing a porous structure of a granulated body shown in the patent document 1 has the following problems. The porous structure of the granulated body formed in accordance with the teaching of the patent document 1 depends on the degree of transpiration of water by drying. Therefore, it is difficult for this method to obtain a sufficient degree of porosity and porosity ratio. Moreover, the wood fibers are inferior in water absorption due to their fibrous structure and formation of the porosity by transpiration of moisture existing among the fibers is limited.

In addition, in the case of water sensitive coagulants as represented by starch and PVA, which exhibit a viscous property and a water retaining property when they detect moisture, are admixed in order to prevent excessive collapsion when the granulated body absorbs excrement and swells, those water sensitive coagulants are deteriorated upon absorption of moisture to degrade the viscous property during use.

On the other hand, the granulated body granulated by hydraulic compression molding as shown in the patent document 2 can prevent deterioration in efficiency of the water sensitive coagulant. However, the degree of porosity and porosity ratio are badly reduced by hard clamping made by a closed mold, and the water absorbing efficiency for absorbing water from excrement is lowered during use. That is, it lacks capability for absorbing water and capturing excrement at the same time it contacts the excrement. In other words, it lacks speed of water absorption and allows excrement to spread widely.

SUMMARY OF THE INVENTION

It is, therefore, an object of the present invention to provide a method of manufacturing a granulated body for absorbing excrement of animals, in which a high degree of porosity and high porosity ratio are provided to a granulated body obtained by granulation in a hydraulic state.

Another object of the invention is to provide a method of manufacturing a granulated body for absorbing excrement of animals, in which a proper porous structure is formed in a granulated body obtained by fixed shape granulation by means of compression molding in a non-hydraulic state.

In order to achieve the above objects, from one aspect of the present invention, there is provided a method of manufacturing a granulated body for absorbing excrement of animals, characterized in that dry bamboo fibers and wood fibers are used as a chief material; the dry bamboo fibers and wood fiber are mixed with each other while adding moisture thereto and the dry bamboo fibers are allowed to absorb the moisture; the resultant is granulated to form a wet granulated body; hot air is blown to the wet granulated body; the moisture absorbed in the dry bamboo fibers is transpired outward through the wet granulated body by the hot air; and a porous structure in the dry bamboo fibers in the wet granulated body is reproduced by the transpiration and transpiring paths are formed in the wet granulated body to obtain a porous structure.

From another aspect of the present invention, there is provided a method of manufacturing a granulated body for absorbing excrement of animals, characterized in that dry bamboo fibers are used as a chief material; moisture is added to the dry bamboo fibers so as to be absorbed therein; the resultant is granulated to form a wet granulated body; hot air is blown to the wet granulated body; the moisture absorbed in the dry bamboo fibers is transpired outward through the wet granulated body by the hot air; and a porous structure in the dry bamboo fibers in the wet granulated body is reproduced by the transpiration and transpiring paths are formed in the wet granulated body to obtain a porous structure.

From a further aspect of the present invention, there is provided a method of manufacturing a granulated body for absorbing excrement of animals, characterized in that dry bamboo fibers and wood fibers are used as a chief material; a water sensitive coagulant composed of powder is mixed therewith; the resultant is admixed in a non-hydraulic state; the resultant is compression molded to form a granulated body having a fixed shape such that a porous structure is enriched in the fixed-shape granulated body by the dry bamboo fibers.

From a still further aspect of the present invention, there is also provided a method of manufacturing a granulated body for absorbing excrement of animals, characterized in that dry bamboo fibers are used as a chief material; a water sensitive coagulant composed of powder is mixed therewith; the resultant is admixed in a non-hydraulic state; the resultant is compression molded to form a granulated body having a fixed shape such that a porous structure is enriched in the fixed-shape granulated body by the dry bamboo fibers.

DETAILED DESCRIPTION OF THE INVENTION

Figure 1:
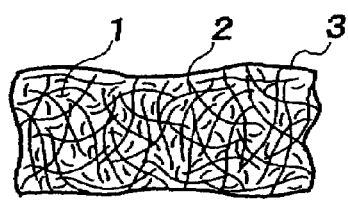
FIG. 1 is a sectional view for explaining a granulated body for absorbing excrement of animals according to the present invention, in which dry bamboo fibers and wood fibers are used as a chief material and granulated in a hydraulic state.

One embodiment of the present invention will be described hereinafter with reference to FIGS. 1 through 7.

Raw bamboos contain large quantities of combined water and free water, and an air dried material thereof refers to a state in which combined water is equalized in concentration of moisture contained in the atmospheric air and a fully dried material thereof refers to a state in which no combined water nor free water exist.

Dry bamboos in dry bamboo fibers 1 according to the present invention refer to the above-mentioned air dried material and fully dried material. The dry bamboos are pulverized to obtain the dry bamboo fibers 1. The fiber length of the dry bamboo fibers 1 is approximately 0.01 mm to 2 mm. For example, the dry bamboo fibers 1 are pulverized by a refiner, a ball mill, a pin mill, a stone mill or the like.

The dry bamboo fibers 1, from which moisture has been removed by drying, have an extremely high porosity ratio compared with the wood fibers 2 and exhibit an extremely high moisture absorbing efficiency both in water absorbing quantity and water absorbing speed.

The present invention provides a method of manufacturing a granulated body for absorbing excrement of animals in which the efficiency of the dry bamboo fibers is utilized in this granulated body so as to enhance its efficiency.

On the other hand, the wood fibers 2 use paper, particularly old paper, made by, for example, a paper making machine as material. Such paper is crushed or pulverized into paper powder. The individual length of the fibers (pulp fibers) is approximately 1 mm to 7 mm. Otherwise, wood meal such as sawdust of wood or the like is used as the wood fibers 2. Otherwise, the pulp fibers existing at the inside of a paper diaper are taken out and used as the wood fibers 2 after the length of the pulp fibers is adjusted.

The present invention provides a method of manufacturing a granulated body for absorbing excrement of animals which endows a high degree of porosity and high porosity ratio to the granulated body 3 obtained by granulation in a hydraulic state.

The present invention also provides a method of manufacturing a granulated body for absorbing excrement of animals, in which a porous structure in a granulated body 3' obtained by granulation into a fixed shape by means of compression molding in a non-hydraulic state is endowed so as to enhance the water absorbing speed.

More specifically, the granulated body 3 obtained by granulation in a hydraulic state is manufactured by the under-mentioned first and second granulating method in a hydraulic state. The granulated body obtained by granulation in a hydraulic state, i.e., both the wet and dry granulated bodies are denoted by reference numeral 3.

<First Hydraulic Granulating Method, See FIGS. 2A–2C and 7>

The first hydraulic granulating method uses the dry bamboo fibers 1 and the wood fibers 2 as a chief material. The fibers 1 and 2 are mixed with each other in a hydraulic state such that the dry bamboo fibers 1 absorb a large quantity of moisture 4b, and the resultant is granulated to form a wet granulated body 3.

The fully dried dry bamboo fibers 1, when dried, are increased in porosity ratio and enlarged in aperture of porosity (degree of porosity) so as to absorb the moisture rapidly, thereby retaining a large quantity of moisture 4b.

As the wet granulating method, for example, the hydraulic mixed material is press fitted in a plurality of extruding holes and extruded, so that the wet granulated body 3, in which the fibers are crushed short, is formed on the outlet port side of the extruding holes.

Hot air 5 is blown to the wet granulated body 3 in which the dry bamboo fibers 1 fully absorb and retain the moisture 4b so that the wet granulated body 3 is enhanced dry.

Figure 7:
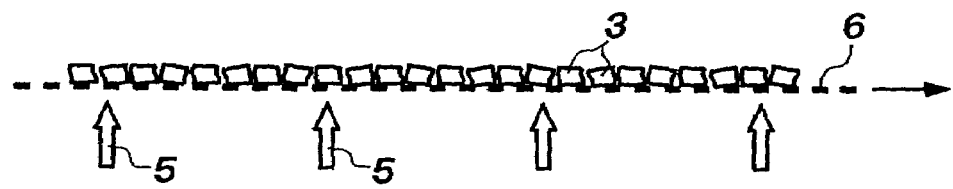
FIG. 7 is a sectional view for explaining a method of drying the hydraulic granulated body of FIGS. 2A–2C and 3 by blowing hot air thereto.

For example, as shown in FIG. 7, the wet granulated bodies 3 are loaded on and conveyed by a conveyer 6 having air permeability. During the conveyance, hot air 6 is jetted upward from under the conveyer 6 so that the hot air 5 is blown to the wet granulated bodies 3 loaded on the conveyer 6 from under surfaces thereof through the conveyer 6. The wet granulated bodies 3 are idly rotated on the conveyer 6 by jet pressure of the jetted hot air 5 and evenly subjected to the hot air. Also, the jetted hot air 5 is caused to invade into the wet granulated bodies 3 by its jet pressure and allowed to evenly heat and dry the wet granulated bodies 3 up to the core part of each wet granulated body 3, to thereby obtain the granulated body 3 for absorbing excrement of animals as shown in FIG. 1.

Figure 2A:
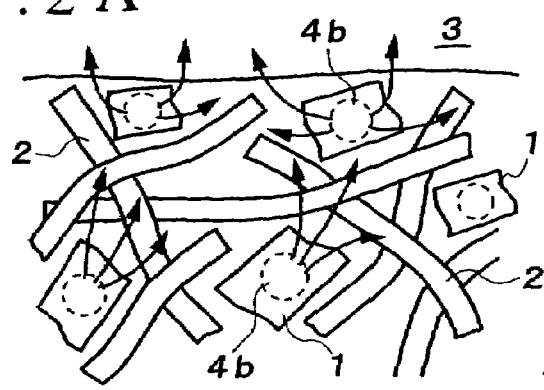
FIG. 2A is an enlarged sectional view for explaining a moisture transpiring state of moisture contained in the dry bamboo fibers of the granulated body.
Figure 2C:
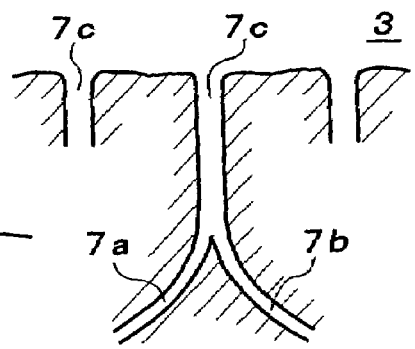
FIG. 2C is an enlarged sectional view for explaining transpiring paths formed by transpiration of moisture contained in and among the fibers.
Figure 2B:
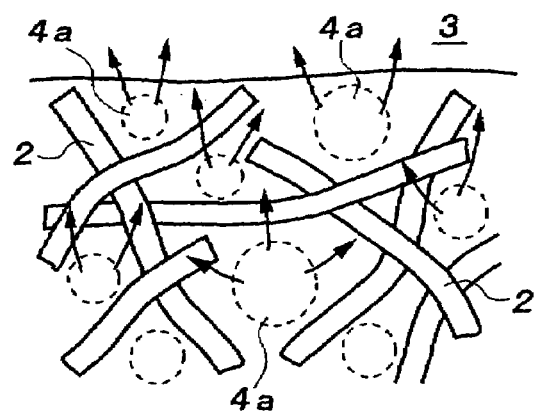
FIG. 2B is an enlarged sectional view for explaining a moisture transpiring state of moisture contained among the fibers of the granulated body.

As shown in FIG. 2B (dry bamboo fibers 1 are not shown), the hydraulic moisture 4a existing among the fibers in the wet granulated body 3, i.e., the moisture 4a among the wood fibers 2 and among the dry bamboo fibers 1 is transpired outward through the granulated body 3. At the same time, as shown in FIG. 2A (dry bamboo fibers 1 are not shown), the hydraulic moisture 4b contained in the fibers which moisture has been absorbed in large quantity into the dry bamboo fibers 1 is transpired outward through the granulated body 3.

A porous structure of the dry bamboo fibers 1 is reproduced at a high porosity and with a high porosity by the transpiration. At the same time, owing to a combined occurrence of this transpiration and the transpiration of the moistures 4a existing among the fibers, an infinite number of transpiring paths are formed. By doing so, a porous structure of the granulated body 3 can be formed with a high porosity ratio and with a high degree of porosity.

That is, as shown in FIG. 2C, the hydraulic moisture 4a existing among the fibers is thermally expanded and allowed to pass through the wet granulated body 3 so as to be discharged outward. By doing so, the transpiring path 7a is formed. At the same time, the large quantity of hydraulic moisture 4b contained in the dry bamboo fibers 1 is thermally expanded and allowed to pass through the wet granulated body 3 so as to be discharged outward. By doing so, the transpiring path 7b is formed. Those transpiring paths 7a, 7b are converged to form an enlarged transpiring path 7c. The wood fibers 2 also absorb the hydraulic moisture and contribute to the formation of the transpiring paths by being dried.

A mixing example of the granulated body for absorbing excrement of animals manufactured in accordance with the first hydraulic granulating method is as follows.

| mixing material | mixing % (wt. %) |
| --- | --- |
| bamboo meal (dry bamboo fibers 1) | 20 to 45% |
| pulp meal (wood fibers 2) obtained by paper making | 30 to 45% |
| starch (coagulant) | 1 to 20% |
| CMC (coagulant) | 1 to 20% |
| water absorptive polymer (water retaining material) | 1 to 20% |
| talc (inorganic filler . . . weight additive) | 1 to 30% |

Moisture of 15 to 35 wt. % is added to the above raw materials.

Any of the starch, CMC (carboxymethyl cellulose) and bentonite, when contacted with the moisture of excrement exhibits viscous properties, retains the granular shape of the granulated body 3 and prevents excessive collapsion, thus proving to function as a moisture sensitive coagulant.

The water absorptive polymer, when contacted with the moisture of excrement, is changed in quality to form a gelatin-like configuration enabling to retain a large quantity of moisture, thus proving to function as a moisture sensitive water retaining material.

Calcium carbonate, clay and the like can be used instead of talc. Those inorganic fillers function as a weight additive for adding weight to the granulated body 3. They can effectively prevent such an inconvenient occurrence of scattering, adhesion to hair or the like when cats or the like are using it.

<Second Hydraulic Granulating Method, see FIGS. 3, 4A, 4B and 7>

The second hydraulic granulating method uses the dry bamboo fibers 1 as a chief material. Water is added to the dry bamboo fibers 1 to allow the fibers to absorb a large quantity of water therein, and the resultant is granulated to form a wet granulated body 3.

The fully dried dry bamboo fibers 1, when dried, are increased in porosity ratio and enlarged in aperture of porosity (degree of porosity) so as to absorb the moisture rapidly, thereby further increasing the absorbing speed compared with the first method and retaining a larger quantity of moisture 4b.

As the wet granulating method, for example, the hydraulic mixed material is press fitted in a plurality of extruding holes and extruded, so that the wet granulated body 3, in which the fibers are crushed short, is formed on the outlet port side of the extruding holes.

Hot air 5 is blown to the wet granulated body 3 in which the dry bamboo fibers 1 fully absorb and retain the moisture 4b so that the wet granulated body 3 is enhanced to dry.

Figure 3:
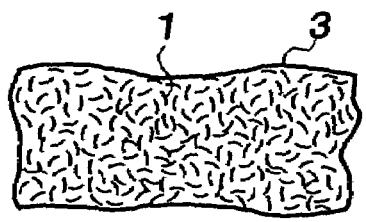
FIG. 3 is a sectional view for explaining a granulated body for absorbing excrement according to the present invention, in which dry bamboo fibers are used as a chief material and granulated in a hydraulic state.

For example, as shown in FIG. 7, the wet granulated bodies 3 are loaded on and conveyed by a conveyer 6 having air permeability. During the conveyance, hot air 6 is jetted upward from under the conveyer 6 so that the hot air 5 is blown to the wet granulated bodies 3 loaded on the conveyer 6 from under surfaces thereof through the conveyer 6. The wet granulated bodies 3 are rollingly moved on the conveyer 6 by jet pressure of the jetted hot air 5 and evenly subjected to the hot air. Also, the jetted hot air 5 is caused to invade into the wet granulated bodies 3 by its jet pressure and allowed to evenly heat and dry the wet granulated bodies 3 up to the core part of each wet granulated body 3, to thereby obtain the granulated body 3 for absorbing excrement of animals as shown in FIG. 3.

Figure 4A:
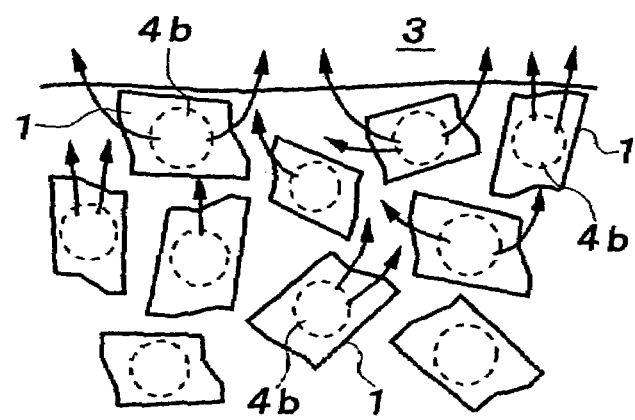
FIG. 4A is an enlarged sectional view for explaining a transpiring state of moisture contained in the dry fibers of the granulated body.
Figure 4B:
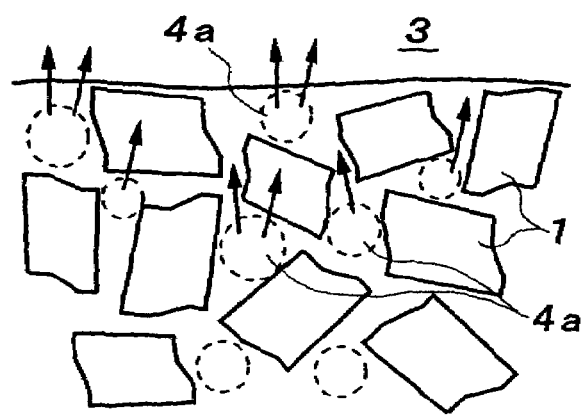
FIG. 4B is an enlarged view for explaining a transpiring state of moisture contained among the fibers of the granulated body.

As shown in FIG. 4B, the hydraulic moisture 4a existing among the fibers in the wet granulated body 3, i.e., the moisture 4a among the wood fibers 2 and among the dry bamboo fibers 1 is transpired outward through the granulated body 3. At the same time, as shown in FIG. 4A, the hydraulic moisture 4b contained in the fibers, which moisture has been absorbed in large quantity into the dry bamboo fibers 1, is transpired outward through the granulated body 3.

A porous structure of the dry bamboo fibers 1 is reproduced at a high porosity and with a high porosity by the transpiration. At the same time, owing to a combined occurrence of this transpiration and the transpiration of the moistures 4a existing among the fibers, an infinite number of transpiring paths are formed. By doing so, a porous structure of the granulated body 3 can be formed with a higher porosity ratio and with a higher degree of porosity.

That is, as shown in FIG. 2C, the hydraulic moisture 4a existing among the fibers is thermally expanded and allowed to pass through the wet granulated body 3 so as to be discharged outward. By doing so, the transpiring path 7a is formed. At the same time, the large quantity of hydraulic moisture 4b contained in the dry bamboo fibers 1 is thermally expanded and allowed to pass through the wet granulated body 3 so as to be discharged outward. By doing so, the transpiring path 7b is formed. Those transpiring paths 7a, 7b are converged to form an enlarged transpiring path 7c.

A mixing example of the granulated body for absorbing excrement of animals manufactured in accordance with the second hydraulic granulating method is as follows.

| mixing material | mixing % (wt. %) |
| --- | --- |
| bamboo meal (dry bamboo fibers 1) | 50 to 95% |
| starch (coagulant) | 1 to 20% |
| water absorptive polymer (water retaining material) | 1 to 20% |
| talc (inorganic filler . . . weight additive) | 1 to 30% |

Moisture of 15 to 35 wt. % is added to the above raw materials.

Any of the starch, CMC (carboxymethyl cellulose) and bentonite exhibits viscous properties, when contacted with the moisture of excrement, retains the granular shape of the granulated body 3 and prevents excessive collapse, thus proving to function as a moisture sensitive coagulant.

The water absorptive polymer, when contacted with the moisture of excrement, is changed in quality to form a gelatin-like configuration enabling to retain a large quantity of moisture, thus proving to function as a moisture sensitive water retaining material.

Calcium carbonate, clay and the like can be used instead of talc. Those inorganic fillers function as a weight additive for adding weight to the granulated body 3. They can effectively prevent such an inconvenient occurrence of scattering, adhesion to hair or the like when cats or the like are using it.

Figure 6:
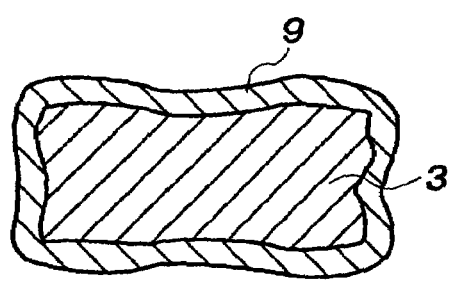
FIG. 6 is a sectional view for explaining an example in which a coating layer is formed on the hydraulic granulated body of FIGS. 2A–2C and 3.

The granulated body 3 manufactured according to the second hydraulic granulating method is used as material for processing excrement of animals as it is. Also, as shown in FIG. 6, a thin coating layer 9 may be formed on the granulated body 3.

The coating layer 9 has water absorptive properties for absorbing moisture of the excrement, exhibits viscous properties when contacted with the moisture of excrement and functions as a coagulating layer for coagulatingly joining the adjacent coarse particles located at the excreting region into a mass-like configuration. This coating layer 9 can be obtained by mixing a viscous material with vegetable fibers.

For example, the coagulating material can be obtained by mixing at least one of starch, CMC, bentonite and the like with wood fibers (pulp meal obtained by paper making) 2. Then, the coagulating material is sprinkled onto the surface of the granulated body 3, which has been dried, by a suitable means such as spraying an adhesive agent thereto.

It is also an interesting alternative that at least one of the starch, CMC, bentonite and the like and water absorptive polymer are added with the wood fibers 2 and then, sprinkled onto the surface of the granulated body 3 in the same manner as mentioned above or by any other suitable means.

The granulated body 3 for absorbing excretion of animals obtained in accordance with the first or second hydraulic granulating method can contribute to generation of a porous structure with a high porosity ratio and with a high degree of porosity, which is generated when the dry bamboo fibers 1 absorb a large quantity of moistures 4b and they are then dried. The porous structure thus obtained is applied to the non-hydraulic granulated body 3.

The excrement contacted with the surface of the hydraulic granulated body 3 is rapidly absorbed into the dry bamboo fibers 1 through the transpiring paths 7c, 7a, 7b with a high porosity ratio and with a high degree of porosity. The absorbed moisture is then rapidly absorbed into the core parts of the dry bamboo fibers 1, thereby enabling to obviate the problems relating to the water absorbing efficiency which are inherent in the conventional hydraulic granulating method.

A granulated body 3' obtained by non-hydraulic compression molding is manufactured by the under-mentioned first and second non-hydraulic granulating methods.

<First Non-Hydraulic Granulating Method . . . See FIGS. 5A and 5B>

The first non-hydraulic granulating method uses the dry bamboo fibers 1 and wood fibers 2 as a chief material and they are mixed with a water sensitive coagulant which is composed of a powder of starch, CMC, bentonite or the like and admixed in a non-hydraulic state.

The resultant is subjected to extrusion compression molding using a mold 8 so that a fixed shape granulated body 3' is formed. By doing so, there is provided a granulated body for absorbing excrement of animals, in which a porous structure is enriched in the fixed shape granulated body 3' by the dry bamboo fibers 1.

A mixing example of the granulated body for absorbing excrement of animals manufactured in accordance with the first non-hydraulic granulating method is as follows.

| mixing material | mixing % (wt. %) |
| --- | --- |
| bamboo meal (dry bamboo fibers 1) | 20 to 45% |
| pulp meal (wood fibers 2) obtained by paper making | 20 to 45% |
| starch (coagulant) | 1 to 20% |
| CMC (coagulant) | 1 to 20% |
| water absorptive polymer (water retaining material) | 1 to 20% |
| talc (inorganic filler . . . weight additive) | 1 to 30% |

Any of the starch, CMC (carboxymethyl cellulose) and bentonite, when contacted with the moisture of excrement exhibits viscous properties, and joins the adjacent fibers to prevent excessive collapse which would otherwise occur due to absorption of the moisture of excretion into the granulated body 3' and viscously attaches the adjacent excrement absorbing particles to form a mass-like configuration, thus proving to function as a moisture sensitive coagulant.

The water absorptive polymer, when contacted with the moisture of excrement, is changed in quality to form a gelatin-like configuration enabling to retain a large quantity of moisture, thus proving to function as a moisture sensitive water retaining material.

Calcium carbonate, clay and the like can be used instead of talc. Those inorganic fillers function as a weight additive for adding weight to the granulated body 3'. They can effectively prevent such an inconvenient occurrence of scattering, adhesion to hair or the like when cats or the like are using it.

<Second Non-Hydraulic Granulating Method . . . See FIGS. 5A and 5B>

The second non-hydraulic granulating method uses the dry bamboo fibers 1 as a chief material and they are mixed with a water sensitive coagulant which is composed of a powder of starch, CMC, bentonite or the like and admixed in a non-hydraulic state.

The resultant is subjected to extrusion compression molding using a mold 8 so that a fixed shape granulated body 3' is formed. By doing so, there is provided a granulated body for absorbing excrement of animals, in which a porous structure is enriched in the fixed shape granulated body 3' by the dry bamboo fibers 1.

A mixing example of the granulated body for absorbing excrement of animals manufactured in accordance with the second non-hydraulic granulating method is as follows.

| mixing material | mixing % (wt. %) |
|---|---|
| bamboo meal (dry bamboo fibers 1) | 50 to 95% |
| starch (coagulant) | 1 to 20% |
| CMC (coagulant) | 1 to 20% |
| water absorptive polymer (water retaining material) | 1 to 20% |
| talc (inorganic filler . . . weight additive) | 1 to 20% |

Any of the starch, CMC (carboxymethyl cellulose) and bentonite, when contacted with the moisture of excrement exhibits viscous properties, and joins the adjacent fibers to prevent excessive collapsion which would otherwise occur due to absorption of the moisture of excretion into the granulated body 3' and viscously attaches the adjacent excrement absorbing particles to form a mass-like configuration, thus proving to function as a moisture sensitive coagulant.

The water absorptive polymer, when contacted with the moisture of excrement, is changed in quality to form a gelatin-like configuration enabling to retain a large quantity of moisture, thus proving to function as a moisture sensitive water retaining material.

Calcium carbonate, clay and the like can be used instead of talc. Those inorganic fillers function as a weight additive for adding weight to the granulated body 3'. They can effectively prevent such an inconvenient occurrence of scattering, adhesion to hair or the like when cats or the like are using it.

Figure 5A:
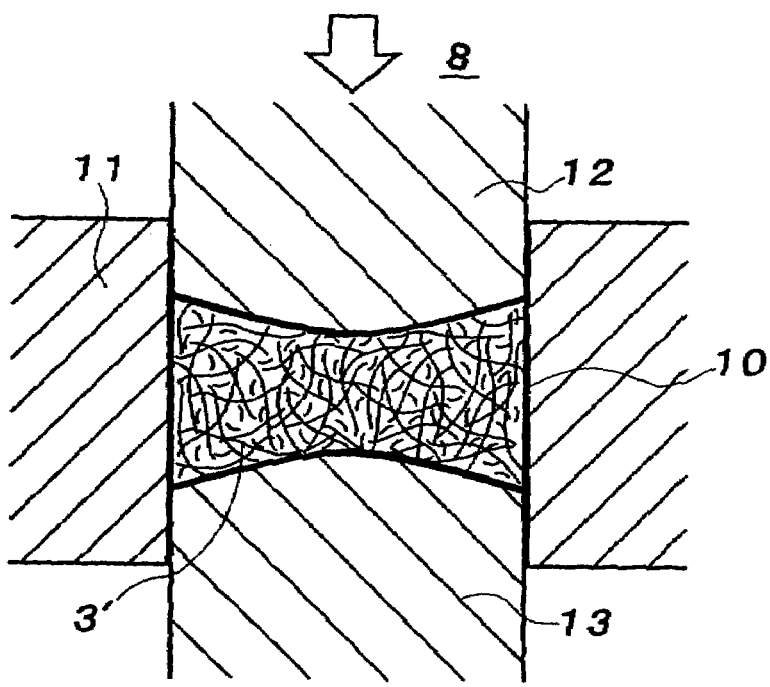
FIG. 5A is a sectional view for explaining the compression molding of a granulated body in a non-hydraulic state according to the present invention.

As shown in FIG. 5A, the mold 8 for shaping the fixed shape granulated body 3' in accordance with the first and second non-hydraulic granulating methods comprises a peripheral surface shaping mold 11 having a circular or polygonal through shaping hole 10, an upper surface shaping pressurizing mold having one or a plurality of pressurizing pins 12 which are inserted into the through shaping hole 10 from above, and a lower surface shaping pressure receiving mold having one or a plurality of pressure receiving pins 13 which are inserted into the through shaping hole 10 from below. After the materials shown in the respective mixing examples are injected into the through shaping hole 10, the pressurizing pins 12 and the pressure receiving pins 13 are clamped within the through shaping hole 10, thereby forming the targeted peripheral surface configuration and upper and lower surface configurations.

Figure 5B:
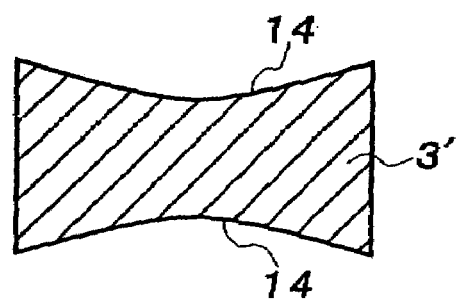
FIG. 5B is a view which is common to a granulated body in which the dry bamboo fibers and wood fibers are used as a chief material and a granulated body in which the dry bamboo fibers are used as the chief material.

For example, as shown in FIG. 5B, in case the upper and lower surfaces of the granulated body 3' are each formed in a concave shape 14, as shown in FIG. 5A, the opposing end faces of the pressurizing pin 12 and the pressure receiving pin 13 are each formed in a convex shape. If the end faces of the pressurizing pin 12 and the pressure receiving pin 13 are each formed in a concave shape, there can be obtained a granulated body 3' having convex upper and lower surfaces.

Although not shown, a so-called pricket machine is used to mold the fixed shape granulated body 3' in which the materials shown in the mixing examples according to the first and second non-hydraulic granulating methods are supplied between a pair of rotatable rollers which have a plurality of concaves formed in the surfaces thereof, and the concaves are brought correctly in opposing relation so that the materials injected in the concaves are compression molded.

Any of the granulated bodies 3' for absorbing excrement of animals obtained by compression molding using the mold 8 in accordance with the first and second non-hydraulic granulating methods includes the dry bamboo fibers 1 as a chief material. The dry bamboo fibers 1 have a porous structure. This porous structure is applied to the non-hydraulic granulated body 3'.

The excrement contacted with the non-hydraulic granulated body 3' is rapidly absorbed the dry bamboo fibers 1, thereby enabling to obviate the problems relating to the water absorbing efficiency which are inherent in the conventional hydraulic granulating method.

The features of the dry bamboo fibers 1 which are used as a chief material in accordance with the first and second hydraulic granulating methods and the first and second non-hydraulic granulating methods are as mentioned below. Those dry bamboo fibers 1 are enriched with anti-virus effect and deodorizing effect and they can be effectively used as an excrement processing material.

The present invention includes a case in which an anti-virus agent or deodorizing agent is mixed with the granulated bodies 3, 3' which are manufactured in accordance with the first and second hydraulic granulating methods and the first and second non-hydraulic granulating methods.

The present invention also includes a case in which powder of soybeans, bean-curd refuse, corn, barley or the like is mixed, as sub-material, with the granulated bodies 3, 3' which are manufactured in accordance with the first and second hydraulic granulating methods and the first and second non-hydraulic granulating methods.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a granulated body for absorbing excrement of animals, comprising:
   pulverizing dry bamboo to obtain dry bamboo fibers;
   pulverizing paper to obtain paper pulp fibers;
   mixing the dry bamboo fibers with the paper pulp fibers while adding moisture so that the moisture is absorbed by the dry bamboo fibers, to thereby form a resultant mixture;
   granulating the resultant mixture to form a wet granulated body; and
   creating externally-opening pores in said body by blowing hot air to said body such that the hot air penetrates said body and causes moisture in said body to transpire outwardly from said body so as to form transpiring paths that constitute said externally-opening pores.

2. A method of manufacturing a granulated body for absorbing excrement of animals, comprising:
   pulverizing dry bamboo to obtain dry bamboo fibers and providing the dry bamboo fibers as a chief material;
   adding moisture to the dry bamboo fibers so that the moisture is absorbed by the dry bamboo fibers, to thereby form a resultant;
   granulating the resultant to form a wet granulated body; and
   creating externally-opening pores in said body by blowing hot air to said body such that the hot air penetrates said body and causes moisture in said body to transpire outwardly from said body so as to form transpiring paths that constitute said externally-opening pores.

* * * * *